(12) United States Patent
Kim et al.

(10) Patent No.: US 12,403,784 B2
(45) Date of Patent: Sep. 2, 2025

(54) VEHICLE BATTERY CHARGING SYSTEM USING MOTOR DRIVING SYSTEM

(71) Applicants: Hyundai Motor Company, Seoul (KR); Kia Corporation, Seoul (KR)

(72) Inventors: Myung Ho Kim, Incheon (KR); Young Seul Lim, Seoul (KR); Sang Cheol Shin, Suwon-Si (KR); Kang Ho Jeong, Hwaseong-Si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 574 days.

(21) Appl. No.: 17/946,829

(22) Filed: Sep. 16, 2022

(65) Prior Publication Data

US 2023/0249566 A1 Aug. 10, 2023

(30) Foreign Application Priority Data

Feb. 7, 2022 (KR) .................. 10-2022-0015595

(51) Int. Cl.
*H02J 7/00* (2006.01)
*B60L 7/10* (2006.01)
B60L 50/60 (2019.01)
*B60L 53/24* (2019.01)
(Continued)

(52) U.S. Cl.
CPC ............... *B60L 53/24* (2019.02); *B60L 7/10* (2013.01); *B60L 50/60* (2019.02); *B60L 53/62* (2019.02);
(Continued)

(58) Field of Classification Search
CPC .. B60L 7/10; B60L 50/60; B60L 53/24; B60L 53/62; B60L 2210/14;
(Continued)

(56) References Cited

U.S. PATENT DOCUMENTS

| 2009/0134700 A1 | 5/2009 | Tanaka et al. |
| 2011/0316461 A1 | 12/2011 | Rippel |

(Continued)

FOREIGN PATENT DOCUMENTS

| EP | 3014729 | 3/2018 |
| EP | 3471263 A1 | 4/2019 |

(Continued)

*Primary Examiner* — Zixuan Zhou
(74) *Attorney, Agent, or Firm* — MORGAN, LEWIS & BOCKIUS LLP

(57) ABSTRACT

A battery charging system includes a first inverter including first switching elements and DC and AC terminals connected to the battery and a first end of the windings of a motor, respectively; a second inverter including second switching elements and DC and AC terminals connected to the battery and a second end of the windings, respectively; third switching elements each having a first end connected to the second end of the windings and a second end connected to each other; a charging capacitor provided between the second end of the third switching elements and a negative terminal of the battery, and to which a DC charging voltage is applied for charging the battery; a fourth switching element connected in series with the charging capacitor between the second end of the third switching elements and the negative terminal; and a controller configured to control the first to fourth switching elements.

10 Claims, 5 Drawing Sheets

(51) Int. Cl.
*B60L 53/62* (2019.01)
*H02J 7/02* (2016.01)
*H02J 7/14* (2006.01)
*H02M 1/08* (2006.01)
*H02M 7/5387* (2007.01)

(52) U.S. Cl.
CPC ................................. *H02J 7/02* (2013.01); *H02J 7/14* (2013.01); *H02M 1/08* (2013.01); *H02M 7/5387* (2013.01); *B60L 2210/14* (2013.01); *B60L 2210/40* (2013.01); *H02J 2207/20* (2020.01)

(58) Field of Classification Search
CPC . B60L 2210/40; H02J 7/02; H02J 7/14; H02J 2207/20; H02M 1/08; H02M 7/5387
USPC ............................................ 320/109; 701/22
See application file for complete search history.

(56) References Cited

U.S. PATENT DOCUMENTS

2018/0241337 A1\* 8/2018 Zou .......................... B60L 3/003
2018/0334043 A1\* 11/2018 Zou .......................... H02M 1/08

FOREIGN PATENT DOCUMENTS

| JP | 2004-254376 | 9/2004 |
| JP | 2014-017990 | 1/2014 |
| JP | 2020-058178 | 4/2020 |
| JP | 2020-162287 | 10/2020 |
| KR | 10-2023-0000334 | 1/2023 |
| KR | 10-2023-0000335 | 1/2023 |
| KR | 10-2023-0013551 | 1/2023 |
| WO | WO 2014/206373 | 12/2014 |

\* cited by examiner

VEHICLE BATTERY CHARGING SYSTEM USING MOTOR DRIVING SYSTEM

CROSS-REFERENCE TO RELATED APPLICATION(S)

The present application claims priority to Korean Patent Application No. 10-2022-0015595, filed on Feb. 7, 2022, the entire contents of which is incorporated herein for all purposes by this reference.

BACKGROUND OF THE PRESENT DISCLOSURE

Field of the Present Disclosure

The present disclosure relates to a vehicle battery charging system using a motor driving system, and more specifically, to a vehicle battery charging system using a motor driving system, wherein a battery inside a vehicle may be charged by use of an open-end winding motor driving system which drives a motor by use of multiple inverters connected to both ends of windings inside the motor, respectively.

Description of Related Art

The fuel efficiency (or energy efficiency) of an eco-friendly vehicle (e.g., electric car) which is powered by torque generated by a motor is determined by the power conversion efficiency of the inverter-motor, and maximizing the inverter power conversion efficiency and the motor efficiency is crucial to fuel efficiency improvement.

Accordingly, a technology has been provided such that a closed-end winding mode in which first ends of windings inside a vehicle driving motor are connected to each other, forming a Y-connection, and the motor is then driven, or an open-end winding mode in which inverters are connected to both ends of motor windings, respectively, to drive the motor while both ends of the motor windings remain open, is selectively determined, driving the motor.

Meanwhile, an electric vehicle (EV) or a plug-in hybrid electric vehicle (PHEV) commonly converts power provided by an external charging facility into a state appropriate for charging the battery inside the vehicle, and provides the same to the battery, charging the battery.

Conventional charging facilities for fast charging are fabricated to output a single voltage specification of 400V, but batteries used inside vehicles tend to be designed to have a voltage of 800V or higher to improve the efficiency or the traveling distance. To charge batteries of vehicles having various voltage magnitudes, charging facilities capable of covering various ranges of voltages corresponding to battery voltage specifications need to be provided, or a single charging facility needs to be implemented to be able to output various ranges of voltages.

There are problems in that huge costs are necessary to construct such a charging infrastructure, and if a low voltage needs to be output due to restrictions on the charging current imposed by the charging facility, the reduced charging power increases the charging time.

Accordingly, the pertinent technical field requires a battery charging scheme, in connection with a motor driving system which drives a motor in an open-end winding mode by use of multiple inverters, capable of converting the magnitude of the charging voltage provided by a charging facility constructed as an existing infrastructure without an additional device and without additional cost increase, charging the battery.

Furthermore, a charging capacitor is connected to a neutral terminal of a Y-connection of a motor to reduce the input voltage ripple of an external charger during fast charging and to maintain a stable voltage, and such a charging capacitor needs to be separated from the neutral terminal when a motor for traveling is driven. To the present end, a relay is applied on a charging current conducting path in a conventional motor driving system, but the large current (charging current) causes a problem of heating, degradation, or burning of the relay.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle battery charging system using a motor driving system, wherein the magnitude of a charging voltage provided by an external charging facility is appropriately converted by use of a motor driving system for driving a motor in an open-end winding mode without a separate dedicated conversion device, charging a battery.

Furthermore, it is another aspect of the present disclosure to provide a vehicle battery charging system using a motor driving system, wherein a charging capacitor and a neutral point of a motor winding may be effectively connected to and disconnected from each other.

Technical problems to be solved by the present disclosure are not limited to the above-mentioned technical problems, and other technical problems not mentioned herein will be clearly understood from the following description by those skilled in the art to which the present disclosure pertains.

In accordance with an aspect of the present disclosure, a battery charging system for charging a battery using a motor driving system for driving a motor including a plurality of windings corresponding to a plurality of phases, respectively, may include: a first inverter including a plurality of first switching elements and having a direct current (DC) terminal connected to the battery and an alternative current (AC) terminal connected to a first end of the plurality of windings; a second inverter including a plurality of second switching elements and having a DC terminal connected to the battery and having an AC terminal connected to a second end of the plurality of windings; a plurality of third switching elements each having a first end connected to the second end of the plurality of windings and a second end connected to each other; a charging capacitor provided between the second end of the plurality of third switching elements and a negative terminal of the battery, and to which a DC charging voltage is applied in a charging mode for charging the battery; a fourth switching element connected in series with the charging capacitor between the second end of the plurality of third switching elements and the negative terminal of the battery; and a controller configured to turn on the fourth switching element in the charging mode and to control open/short-circuited states of the plurality of first switching elements, the plurality of second switching elements, and the plurality of third switching elements based on a magnitude of the DC charging voltage and a magnitude of a voltage of the battery.

For example, the battery charging system may further include a first charging power application switch of which a first end is connected to the second end of the plurality of third switching elements and in which a high-potential of the DC charging voltage is applied to a second end thereof, and a second charging power application switch of which a first end is connected to the negative terminal of the battery and in which a low-potential of the DC charging voltage is applied to a second end thereof, and the controller may be configured to control the first charging power application switch and the second charging power application switch to be in the short-circuited state in the charging mode.

For example, the controller may turn off the fourth switching element in a driving mode for driving the motor.

For example, the charging capacitor may be electrically separated from a neutral terminal of the motor formed at the second end of the plurality of third switching elements when the fourth switching element is turned off.

For example, the fourth switching element may include an FET.

For example, the fourth switching element may be mounted on an inverter board on which the first inverter and the second inverter are mounted.

For example, the charging capacitor may be provided between the second end of the plurality of third switching elements and the fourth switching element.

For example, the fourth switching element may be provided between the second end of the plurality of third switching elements and the charging capacitor.

For example, when the DC charging voltage is lower than the voltage of the battery, the controller may, in the charging mode, control all of the plurality of third switching elements to be in the short-circuited state, and may perform pulse width modulation control on a lower switching element of the first inverter to boost the DC charging voltage, the lower switching element of the first inverter being a switching element connected to a low-potential terminal of the DC terminal among the switching elements included in the first inverter.

For example, when the DC charging voltage corresponds to the voltage of the battery, the controller may, in the charging mode, control all of the plurality of third switching elements to be in the short-circuited state, and may control the charging current to be transmitted to the battery through an upper switching element of the second inverter, the upper switching element of the second inverter being a switching element connected to a high-potential terminal of the DC terminal among the switching elements included in the second inverter.

According to the vehicle battery charging system using a motor driving system, a motor driving system provided for open-end winding driving of a motor is utilized to appropriately convert the magnitude of a charging voltage according to the magnitude of a charging voltage provided by an external charger, charging a battery.

Accordingly, the vehicle battery charging system using a motor driving system makes it unnecessary to construct an additional infrastructure for an additional high-voltage charging facility in line with the high voltage of vehicle batteries so that no social cost for infrastructure construction will be incurred.

In addition, the vehicle battery charging system using a motor driving system enables battery charging in response to various external charging voltages together with motor driving in a highly-efficient open-end winding type.

Moreover, the vehicle battery charging system using a motor driving system, controls whether to connect a charging capacitor and a neutral point of a motor winding through a semiconductor switching element, and thus is excellent in terms of heating, cooling, resistance to impacts, and burning compared with a relay.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
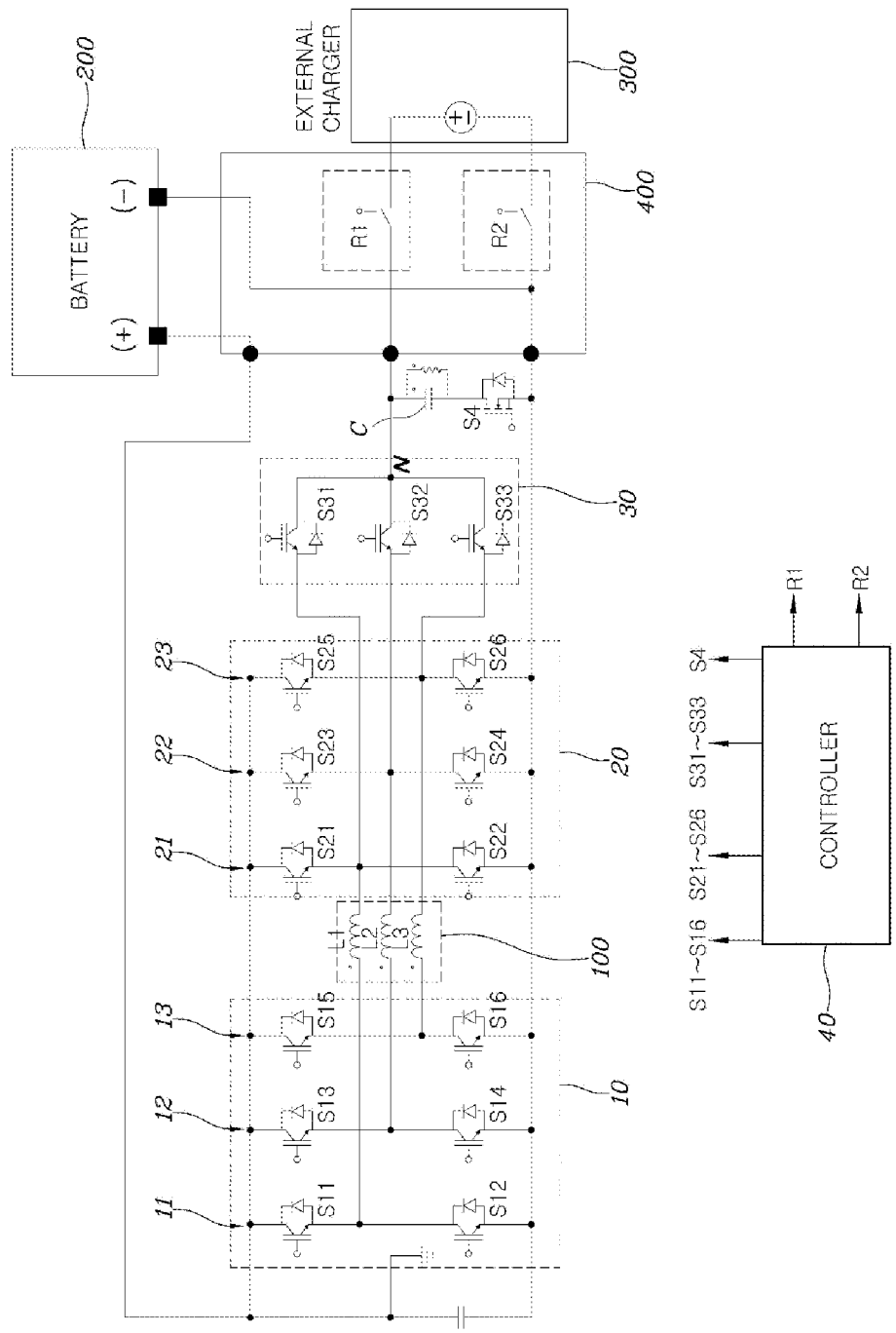
FIG. 1 is a circuit diagram illustrating a vehicle battery charging system using a motor driving system according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a vehicle battery charging system using a motor driving system according to various embodiments of the present disclosure will be described in detail with reference to the accompanying drawings.

FIG. 1 is a circuit diagram illustrating a vehicle battery charging system using a motor driving system according to an exemplary embodiment of the present disclosure.

Referring to FIG. 1, a vehicle battery charging system using a motor driving system according to an exemplary embodiment of the present disclosure is a charging system that utilizes a motor driving system for supplying driving power to a motor 100 including a plurality of windings L1, L2 and L3 corresponding to a plurality of phases.

First, the motor driving system may include a first inverter 10 including a plurality of first switching elements S11, S12, S13, S14, S15 and S16 and to be connected to one end of each of the windings of the motor 100, a second inverter 20 including a plurality of second switching elements S21, S2, S23, S24, S25 and S26 and to be connected to the other end of each of the windings of the motor 100, and a plurality of third switching elements S31, S32 and S33 having one end connected to the other end of each of the windings of the motor 100 and the other end short-circuited to each other.

The first inverter 10 may have a DC terminal to which a DC voltage formed between a positive terminal and a negative terminal of the battery 200 is applied and an AC terminal connected to each of the windings L1, L2 and L3 of the motor 100. Two nodes of the first inverter 10 to which the positive terminal and the negative terminal of the battery 200 are connected may be the DC terminal, and three nodes in which the first inverter 10 is connected to one end of each of the windings of the motor 100 may be the AC terminal.

Similarly, the second inverter 20 may have a DC terminal selectively connectable to the DC terminal of the first inverter 10 and an AC terminal connected to each of the winding L1, L2 and L3 of the motor 100. Two nodes including one node in which the second inverter 20 is selectively connectable to the DC terminal of the first inverter 10 may be the DC terminal, and three nodes in which the second inverter 20 is connected to the other end of each of the windings of the motor 100 may be the AC terminal.

In a motor driving mode in which the motor generates power for driving a vehicle, the first inverter 10 and the second inverter 20 have a common DC terminal connected to the battery 200 to convert DC power stored in the battery 200 into three-phase AC power and provide the AC power to the motor 100, or to convert, into DC, regenerative braking energy generated by the generation of regenerative braking torque of the motor 100 during regenerative braking and provide the DC to the battery 200. The present conversion between DC power and AC power may be performed by pulse width modulation control of the plurality of first switching elements S11, S12, S13, S14, S15 and S16 and the plurality of second switching elements S21, S2, S23, S24, S25 and S26 respectively provided in the first inverter 10 and the second inverter 20.

The first inverter 10 may include a plurality of legs 11, 12 and 13 to which a DC voltage formed in the DC terminal is applied. Each of the legs 11, 12 and 13 may correspond to each of the phases of the motor 100 to form an electrical connection.

The first leg 11 may include two switching elements S11 and S12 connected in series between two nodes forming a DC terminal, and a connection node of the two switching elements S11 and S12 may be connected to one end of the winding L1 of one phase in the motor 100 so that AC power corresponding to one of the plurality of phases of the motor 100 is input and output.

Similarly, the second leg 12 may include two switching elements S13 and S14 connected in series between two nodes forming a DC terminal, and a connection node of the two switching elements S13 and S14 may be connected to one end of the winding L2 of one phase in the motor 100 so that AC power corresponding to one of the plurality of phases of the motor 100 is input and output.

Furthermore, the third leg 13 may include two switching elements S15 and S16 connected in series between two nodes forming a DC terminal, and a connection node of the two switching elements S15 and S16 may be connected to one end of the winding L3 of one phase in the motor 100 so that AC power corresponding to one of the plurality of phases of the motor 100 is input and output.

The second inverter 20 may also have a configuration similar to that of the first inverter 10. The second inverter 20 may include a plurality of legs 21, 22 and 23 to which a DC voltage of a DC terminal to which a DC voltage between two terminals of the battery 200 is applied is applied. Each of the legs 21, 22 and 23 may correspond to the plurality of phases of the motor 100 to form an electrical connection.

The first leg 21 may include two switching elements S21 and S22 connected in series between two nodes forming a DC terminal, and a connection node of the two switching elements S21 and S22 may be connected to the other end of the winding L1 of one phase in the motor 100 so that AC power corresponding to one of the plurality of phases of the motor 100 is input and output.

Similarly, the second leg 22 may include two switching elements S23 and S24 connected in series between two nodes forming a DC terminal, and a connection node of the two switching elements S23 and S24 may be connected to the other end of the winding L2 of one phase in the motor 100 so that AC power corresponding to one of the plurality of phases of the motor 100 is input and output.

In addition, the third leg 23 may include two switching elements S25 and S26 connected in series between two nodes forming a DC terminal, and a connection node of the two switching elements S25 and S26 may be connected to one end of the winding L3 of one phase in the motor 100 so that AC power corresponding to one of the plurality of phases of the motor 100 is input and output.

The first inverter 10 may be connected to one end of the windings L1, L2 and L3 of the motor 100 and the second inverter 20 may be connected to the other end of the windings L1, L2 and L3 of the motor 100. That is, an electrical connection of an open-end winding structure in which both ends of the windings L1, L2 and L3 of the motor 100 are respectively connected to the first inverter 10 and the second inverter 20 may be formed.

The switching elements S11, S12, S13, S14, S15 and S16 and S21, S2, S23, S24, S25 and S26 included in the first inverter 10 and the second inverter 20 may be switching elements included in a typical inverter for driving a motor, and should be understood as a concept including IGBT or FET in which switching is actually performed and a diode connected in the reverse direction between the source and the drain of the IGBT or FET.

The plurality of third switching elements S31, S32 and S33 may be connected to the other end (AC terminal of the second inverter) of the windings L1, L2 and L3 of the motor 100. The third switching elements S31, S32 and S33 may be referred to as "split switches". One end of the plurality of split switches S31, S32 and S33 may be connected to one end of the windings L1, L2 and L3 of the motor 100, and the other end thereof may be connected to each other to form an electrical short.

When the plurality of split switches S31, S32 and S33 are opened, both ends of the windings L1, L2 and L3 of the motor 100 may be respectively connected to the first inverter 10 and the second inverter 20 to form an open-end winding structure. In addition, when the plurality of split switches S31, S32 and S33 are short-circuited, the other ends of the windings L1, L2 and L3 of the motor 100 may be electrically short-circuited to each other, and an electrical connection of a closed-end winding structure in which the windings L1, L2 and L3 of the motor 100 forms a Y-connection may be formed. When the electrical connection of the closed-end winding structure is formed, the motor 100 may be driven (i.e., CEW driving mode) by performing pulse width modulation control on the switching elements S11, S12, S13, S14, S15 and S16 of the first inverter 10, and the switching elements S21, S2, S23, S24, S25 and S26 of the second inverter 20 may always maintain an open state.

The plurality of split switches S31, S32 and S33 may be collectively referred to as a split switch unit 30 because they are configured to switch a circuit connection structure for driving the motor between the open-end winding structure and the closed-end winding structure.

The controller 40 may perform pulse width modulation control on the switching elements S11, S12, S13, S14, S15 and S16 and S21 to S21 included in the first inverter 10 and the second inverter 20 so that the motor 100 may be driven based on an output required for the motor 100 in the motor driving mode.

The controller 40 may determine an inverter used for driving the motor based on the required output of the motor 100 and accordingly, may determine the ON/OFF state of the plurality of split switches S31, S32 and S33 of the split switch unit 30, so that it is possible to perform pulse width modulation control on the switching element of the converter whose driving is determined.

For example, when the output required for the motor 100 is smaller than a predetermined reference value, the controller 40 may configure all of the plurality of split switches S31, S32 and S33 of the split switch unit 30 to a short-circuited state and may perform pulse width modulation control on the switching elements S11, S12, S13, S14, S15 and S16 of the first inverter 10 without operating the second inverter 20, driving the motor 100 (i.e., a closed-end winding mode).

The driving of the motor in the closed-end winding (CEW) mode may be achieved such that the controller 40 performs pulse width modulation control on the switching elements S11, S12, S13, S14, S15 and S16 of the first inverter 10 based on a DC voltage applied to the DC terminal of the first inverter 10, a phase current provided to the motor 100 from the AC terminal of the inverter 10, and a motor rotation angle detected by a motor rotor sensor provided in the motor 100. Because various techniques for driving the motor 100 by performing pulse width modulation control on the plurality of switching elements in the inverter are already known in the art, further detailed description of the pulse width modulation control method of the inverter will be omitted.

Meanwhile, when the output required for the motor 100 is greater than the predetermined reference value, the controller 100 may configure all of the plurality of split switches S31, S32 and S33 of the split switch unit 30 to the open state and may operate both the first inverter 10 and the second inverter 20 to drive the motor 100 (that is, the open-end winding mode). In the open-end winding mode, the motor 100 may be driven such that one end of the plurality of windings L1, L2 and L3 is in an open state and the other end thereof is also in an open state, and pulse width modulation control is performed on the two inverters 10 and 20 connected to both ends of the windings L1, L2 and L3, respectively.

The driving of the motor in the open-end winding mode may be achieved such that the controller 100 performs pulse width control on the first switching elements S11, S12, S13, S14, S15 and S16 of the first inverter 10 and the second switching elements S21, S2, S23, S24, S25 and S26 of the second inverter 20 together by receiving the DC voltages of the first inverter 10 and the second inverter 20, the phase current provided to the plurality of windings corresponding to each phase of the motor 100, the motor angle detected by a motor rotor sensor provided in the motor 100, and the like.

Various techniques for driving the motor by performing pulse width modulation control on the two inverters connected to both ends of the winding in the open-end winding mode are already known in the art, and thus a further detailed description thereof will be omitted.

In a charging mode for charging the battery, the controller 40 may cause a DC charging voltage to be applied between the other end of the plurality of split switches S31, S32 and S33 and a negative terminal of the battery 200, and may control the switching elements S11, S12, S13, S14, S15 and S16 and S21 to S26, the switches S31 to S33, and a fourth switching element S4 included in the first inverter 10 and the second inverter 20 so that the magnitude of the DC charging voltage is converted and provided to the battery based on the magnitude of the DC charging voltage.

The DC power provided from an external charger 300 may be applied between a node to which the plurality of split switches S31, S32 and S33 of the split switch unit 30 are interconnected and a node to which the negative terminal of the battery 200 is connected. That is, the charging voltage provided from the external charger 300 may be applied between a node to which the plurality of split switches S31, S32 and S33 are interconnected and a node to which the negative terminal of the battery 200 is connected.

To form or block an electrical connection between the external charger 300 and the motor driving system, an exemplary embodiment of the present disclosure may further include charging power application switches R1 and R2 and the fourth switching element S4.

The vehicle may include a charging inlet to which the external charger 300 is connected, and during charging, the charging inlet may be engaged with a charging outlet of the external charger 300. The charging outlet of the external charger 300 may have a high-potential terminal (positive terminal) and a low-potential terminal (negative terminal) forming a charging voltage, and these terminals may be respectively connected to the high-potential terminal and the low-potential terminal of the charging inlet. A first charging power application switch R1 may be connected between the high-potential terminal of the charging inlet and a node to which the plurality of split switches S31, S32 and S33 are interconnected, and a second charging power application switch R2 may be connected between the low-potential terminal of the charging inlet and the negative terminal of the battery 200.

A charging capacitor C may be connected between the other end of the split switch unit 30 and the negative terminal of the battery. In addition, the fourth switching element S4 may be connected in series with the charging capacitor C. In other words, one end of the charging capacitor C may be connected between the node to which the split switch unit 30 and the first charging power application switch R1 are interconnected, and the other end of the charging capacitor C may be connected to the node to which the negative terminal of the battery 200 is connected.

As described above, because the fourth switching element S4 is connected in series with the charging capacitor C, it is not necessary to ensure performance assuming the conduction of a large current, unlike a case of using a relay on a path through which a large current (hundreds of A) of charging current conducts. Accordingly, it is possible to effectively control a connection between the charging capacitor C and a neutral terminal N even with a semiconductor type switching device without increasing the size or material cost for the large current. For example, a relatively small sized and inexpensive FET compared to the relay configured for conducting a large current may be applied to the fourth switching element S4. In the instant case, not only the material cost is reduced, but also an overall size of the inverter module is reduced, so that it is possible to achieve an effect of improving the output density. In addition, by mounting the FET for relay in an inverter board through PCB design, the FET for relay may be implemented without additional space, and the pin of the FET may be soldered to the board, so that a disadvantage of reliability deterioration due to vibration when driving the vehicle may be compensated. Additionally, by designing the location of the FET within a housing cooling range, there is an effect that the FET may also be cooled when a coolant is circulated for cooling the inverter board. However, because the FET is an exemplary embodiment of the fourth switching device S4, it is not necessarily limited thereto, and it is apparent to those skilled in the art that various semiconductor-type switching devices may be applied.

Therefore, in a case in which the external charger 300 is connected to the vehicle to perform charging, when the controller 40 turns on the split switch unit 30 and the fourth switching element S4, the neutral terminal N of the motor windings L1, L2 and L3 may be formed at the other end of the split switch unit 30, and the charging capacitor C may be connected to the neutral terminal N. When the charging capacitor C is connected to the neutral terminal N, it is possible to reduce the input voltage ripple of the external charger 300 and stably maintain the voltage.

However, the charging capacitor C needs to be electrically separated from the neutral terminal N for normal operation of the inverters 10 and 20 when the motor 100 is driven. Therefore, when the controller 40 turns off the fourth switching element S4 at the time of driving of the motor 100, the (−) terminal of the charging capacitor C and the ground may be separated, so that the charging capacitor C may be electrically separated from the neutral terminal N of the motor 100.

Meanwhile, the controller 40 may control the first charging power application switch R1 and the second charging power application switch R2 to be always open in the motor driving mode. In addition, the controller 40 may control the first charging power application switch R1 and the second charging power application switch R2 to always be in a short-circuited state in the battery charging mode.

Various switching means known in the art may be applied to the first charging power application switch R1 and the second charging power application switch R2, but the first charging power application switch R1 and the second charging power application switch R2 are used for maintaining the open/short-circuited state that are determined at the time of determining the mode switching or voltage rising/falling while the mode is continued, so that fast switching is not required. Accordingly, the first charging power application switch R1 and the second charging power application switch R2 are implemented as a relay.

Here, the first charging power application switch R1 and the second charging power application switch R2 may be implemented in a form of a junction box 400 for forming an electrical connection relationship in a circuit. For example, the junction box 400 may be implemented in a form of hardware including a connection for forming an electrical connection between the high voltage terminal and the low voltage terminal of the battery 200 and the two terminals of the DC terminal of the inverter, a connection between the first and second charging power application switches R1 and R2 and the external charger, a connection between the first and second charging power application switches R1 and R2 with the split switch unit 30 and the DC terminals of the inverters 10 and 20.

Figure 2:
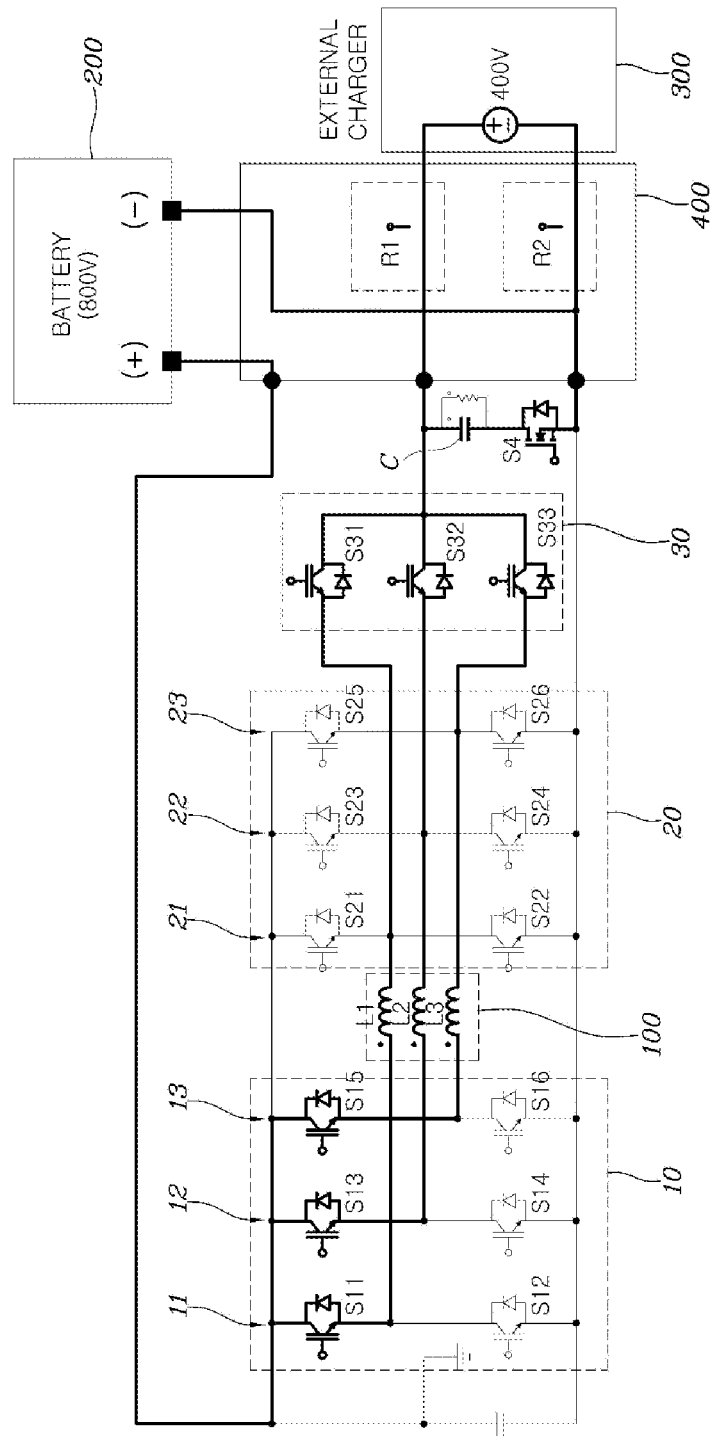
FIG. 2 and FIG. 3 are diagrams illustrating an operating state of a vehicle battery charging system using a motor driving system according to an exemplary embodiment of the present disclosure.
Figure 3:
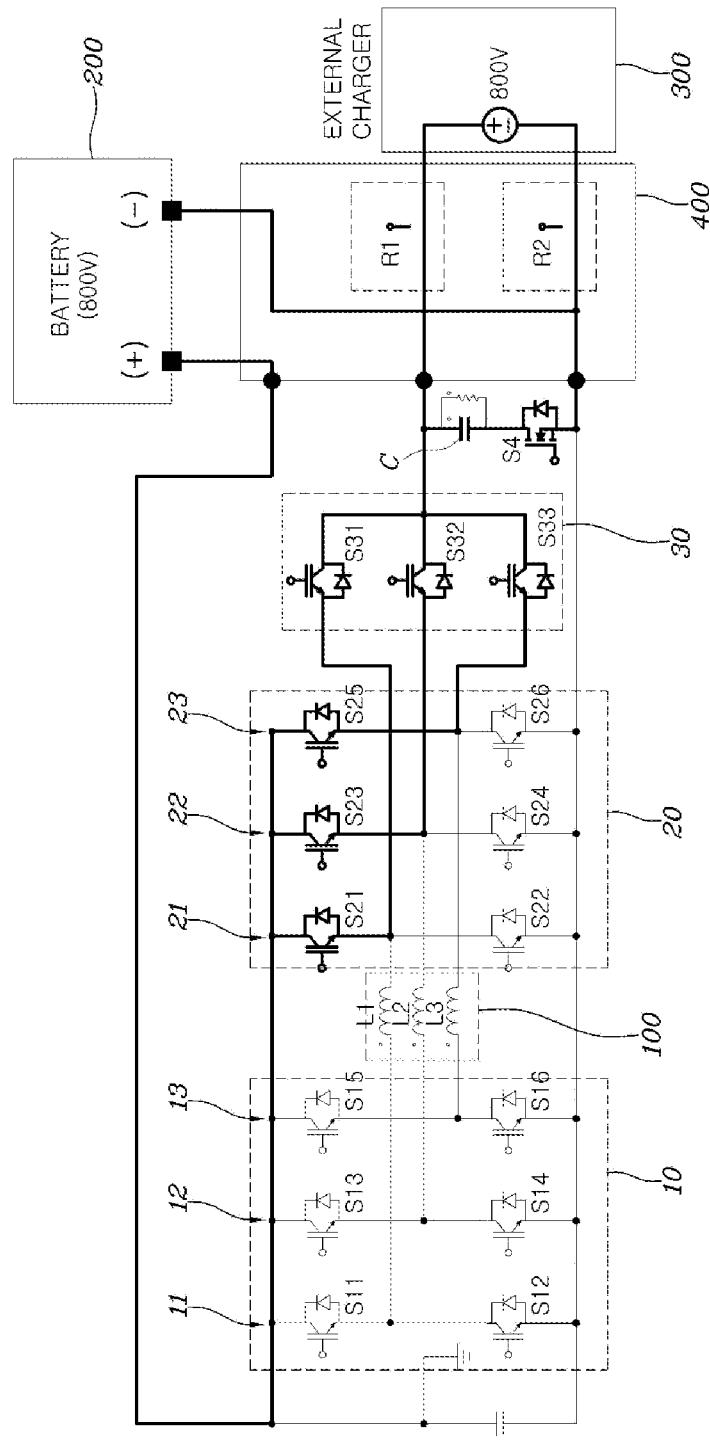

FIG. 2 and FIG. 3 are diagrams illustrating an operating state of a vehicle battery charging system using a motor driving system according to an exemplary embodiment of the present disclosure.

First, FIG. 2 illustrates an example in which the charging voltage (e.g., 400V) supplied from the external charger 300 in the charging mode is lower than the voltage (e.g., 800V) of the battery 200 of the vehicle.

As shown in FIG. 2, the controller 40 may control all of the charging power application switches R1 and R2 to be in a short-circuited state in the charging mode, and may control switches S31, S32, and S33 of the split switch unit 30 to maintain a short-circuited state. In addition, the controller 40 may control all of the switching elements S21, S2, S23, S24, S25 and S26 of the second inverter 20 to maintain an open state.

Accordingly, windings L1, L2 and L3 of the motor 100, diodes of upper switching elements S11, S13, and S15 of the first inverter 10 connected to one end of the windings L1, L2 and L3, and lower switching elements S12, S14, and S16 of the first inverter 10 may form a topology of a boost converter configured for raising a voltage in a direction from the external charger 300 to the battery 200. By use of the topology of the boost converter, the charging voltage provided from the external charger 300 may be raised and provided to the battery 200 so that the battery 200 may be charged.

In the instant case, because the voltage of the DC terminal of the second inverter 20 is greater than the voltage provided from the external charger 300, a current flowing to the second inverter 20 may be blocked by the reverse diode of the upper switching elements S21, S23, and S25 of the second inverter 20.

Here, the upper switching elements S11, S13, and S15 refer to switching elements connected to the high-potential terminal of the DC terminal among the two switching elements included in the legs of the inverter, and the lower switching elements refer to switching elements connected to the low-potential terminal of the DC terminal.

In addition, although FIG. 2 shows an example in which all the switches S31, S32 and S33 of the split switch unit 30 maintain the short-circuited state and then raise the voltage, the controller 40 may selectively cause only some of the switches S31, S32 and S33 of the split switch unit 30 to be short-circuited and then may perform pulse width modulation control on the lower switching element connected to the switch that maintains the short-circuited state, so that the voltage may be raised.

In a case in which the switches S31, S32 and S33 of the split switch unit 30 corresponding to each phase of the motor maintain a short-circuited state at the time of raising the voltage and all of the lower switches S12, S14, and S16 of the first inverter 10 are switched to raise the voltage, the controller 40 may control the boost converter corresponding to each phase in an interleaved manner.

An interleaved control technique using the boost converter and plurality of boost converters, which include a coil (inductor), a diode, and a switch to increase the magnitude of the voltage through pulse width modulation control of the switch, is well known in the art, and thus an additional description thereof will be omitted.

Next, FIG. 3 illustrates an example of a case (e.g., 800V) in which the charging voltage supplied from the external charger 300 corresponds to the voltage (e.g., 800V) of the battery 200 of the vehicle in the charging mode. In the instant case, there is no need to increase or decrease the charging voltage, and the charging current may be directly supplied to the battery 200 so that the battery 200 may be charged.

As illustrated in FIG. 3, the controller 40 may control all of the charging power application switches R1 and R2 to be in a short-circuited state in the charging mode, and may control the switches S31, S32, and S33 of the split switch unit 30 to maintain the short-circuited state. In addition, the controller 40 may control all of the switching elements S11, S12, S13, S14, S15 and S16 of the first inverter 10 to maintain an open state.

Accordingly, the charging current may be transmitted to the battery 200 through the upper switches S21, S23, and S25 of the second inverter 20.

Figure 4:
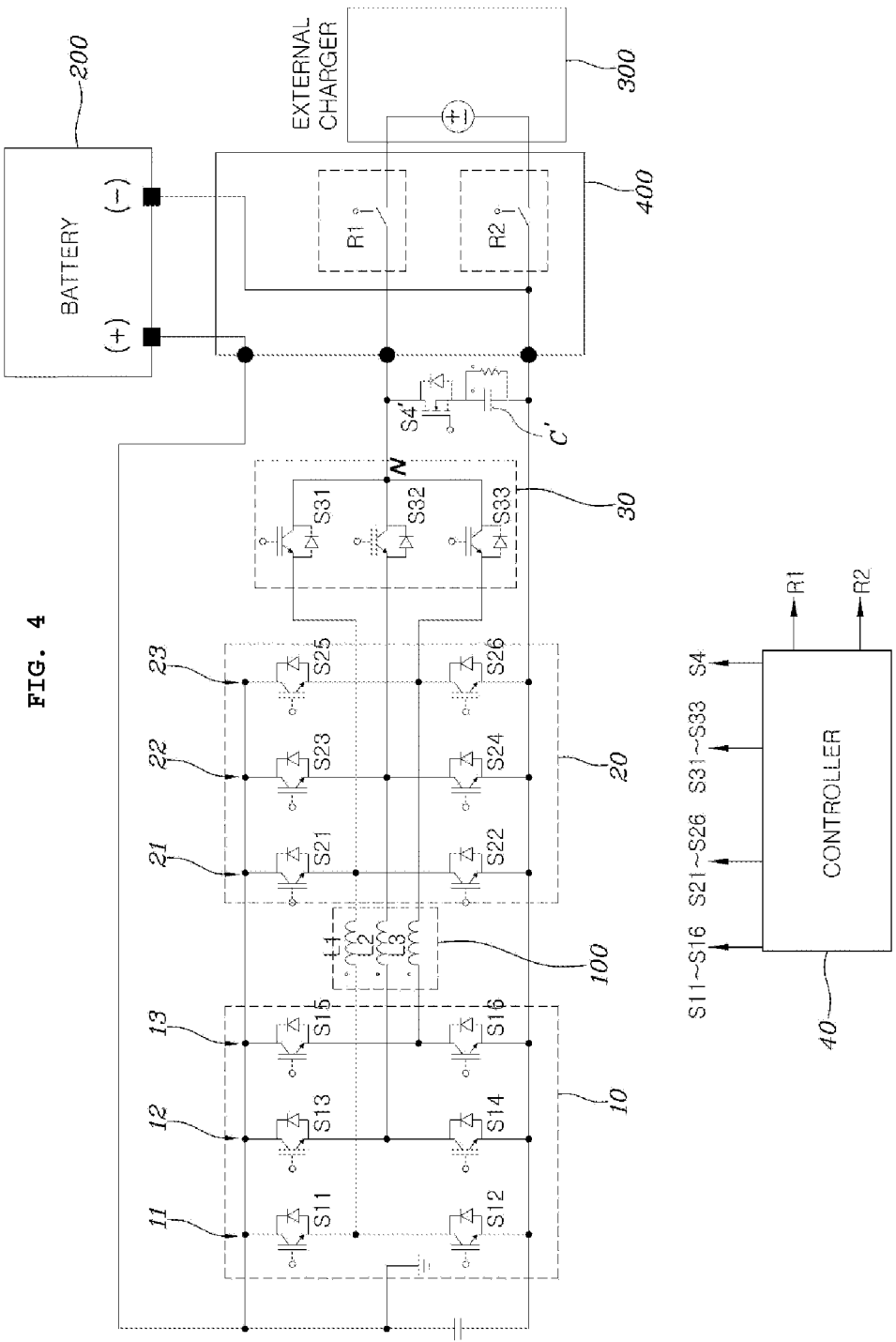
FIG. 4 is a circuit diagram illustrating a vehicle battery charging system using a motor driving system according to another aspect of an exemplary embodiment of the present disclosure.

FIG. 4 is a circuit diagram illustrating a vehicle battery charging system using a motor driving system according to another aspect of an exemplary embodiment of the present disclosure.

In the motor driving system shown in FIG. 4 compared to the motor driving system illustrated in FIG. 1, the connection order of a charging capacitor C' and a fourth switching element S4' connected in series between the other end of the split switch unit 30 and the negative terminal of the battery is changed.

Even through this change, in a same manner, whether the charging capacitor C' and the neutral terminal N are electrically connected to each other may be determined by the control of the fourth switching element S4' according to whether the battery is charged and the motor is driven, so that an appropriate element arrangement is possible according to the design of an inverter housing.

Figure 5:
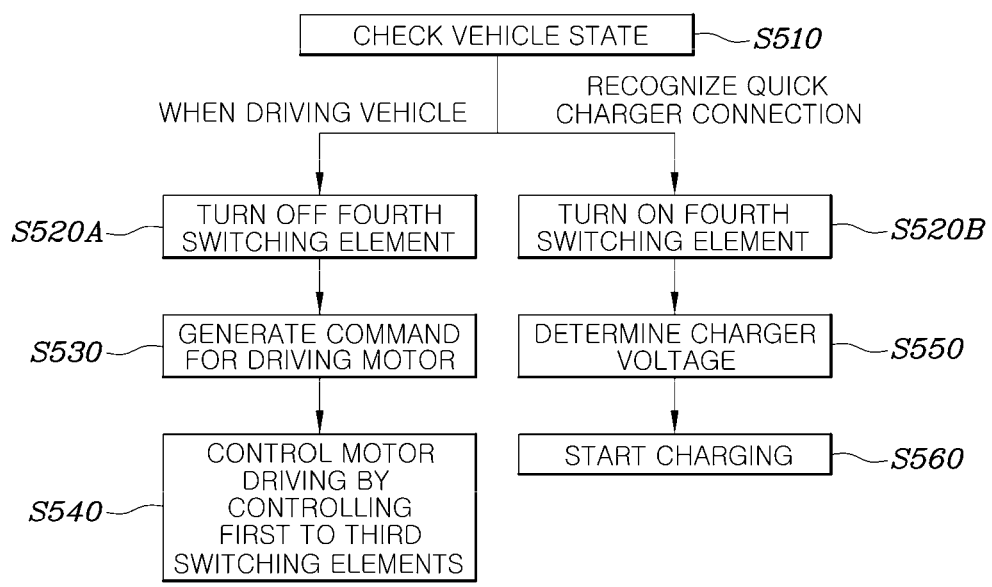
FIG. 5 is a flowchart illustrating an example of a control process of a motor driving system according to an exemplary embodiment of the present disclosure.

FIG. 5 is a flowchart illustrating an example of a control process of a motor driving system according to an exemplary embodiment of the present disclosure.

Referring to FIG. 5, first, in operation S510, the controller 40 may determine whether the current state of the vehicle is a motor driving mode or a fast charging mode.

When the vehicle is currently in the motor driving mode, in operation S520A, the controller 40 may turn off the fourth switching element S4 to electrically separate the neutral terminal N of the motor windings L1, L2 and L3 from the charging capacitor C.

In addition, in operation S530, the controller 40 may determine a CEW driving mode or an OEW driving mode according to a requested output of the motor 100, and may generate voltage and current commands for driving the motor according to the determined driving mode.

In operation S540, based on the voltage and current commands, the controller 40 may control first, second, and third switching elements to drive the motor.

On the other hand, when the vehicle is currently in the battery charging mode, in operation S520B, the controller 40 may turn on the fourth switching element S4 to electrically connect the neutral terminal N of the motor windings L1, L2 and L3 with the charging capacitor C.

The controller 40 may determine the charging voltage by recognizing a charger connection in operation S550, and may control the first, second, and third switching elements to raise the voltage so that the charging current may be transmitted to the battery or transmitted directly to the battery in operation S560, as described above with reference to FIG. 2 or 3.

As described above, the vehicle battery charging system using the motor driving system according to various embodiments of the present disclosure may utilize the motor driving system provided for driving the open-end winding of the motor to appropriately convert the magnitude of the charging voltage according to the magnitude of the charging voltage provided from the external charger, facilitating the battery to be charged.

Therefore, the vehicle battery charging system using the motor driving system according to various embodiments of the present disclosure may eliminate the need to build additional infrastructure for additional high-voltage charging facilities according to the high voltage of the vehicle battery, so that the social cost may be avoided.

In addition, the vehicle battery charging system using the motor driving system according to various embodiments of the present disclosure may drive the motor in a high-efficiency open-end winding manner and may enable battery charging corresponding to various external charging voltages.

In addition, because the charging current does not directly conduct to the fourth switching element, the fourth switching element may be implemented as a semiconductor-type switching element, so that the inverter module may be miniaturized, and cooling of the fourth switching element may be facilitated.

In addition, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

In addition, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery charging system for charging a battery using a motor driving system for driving a motor including a plurality of windings corresponding to a plurality of phases, respectively, the battery charging system comprising:
   a first inverter including a plurality of first switching elements and including a direct current (DC) terminal connected to the battery and an alternative current (AC) terminal connected to a first end of the plurality of windings;
   a second inverter including a plurality of second switching elements and including a DC terminal connected to the battery and an AC terminal connected to a second end of the plurality of windings;
   a plurality of third switching elements each including a first end connected to the second end of the plurality of windings and a second end connected to each other;
   a charging capacitor provided between the second end of the plurality of third switching elements and a negative terminal of the battery, and to which a DC charging voltage is applied in a charging mode for charging the battery;
   a fourth switching element connected in series with the charging capacitor between the second end of the plurality of third switching elements and the negative terminal of the battery; and
   a controller configured to turn on the fourth switching element in the charging mode and to control open/short-circuited states of the plurality of first switching elements, the plurality of second switching elements, and the plurality of third switching elements based on a magnitude of the DC charging voltage and a magnitude of a voltage of the battery.

2. The battery charging system of claim 1, further including:
   a first charging power application switch of which a first end is connected to the second end of the plurality of third switching elements and in which a high-potential of the DC charging voltage is applied to a second end thereof, and a second charging power application switch of which a first end is connected to the negative terminal of the battery and in which a low-potential of the DC charging voltage is applied to a second end thereof,
   wherein the controller is configured to control the first charging power application switch and the second charging power application switch to be in the short-circuited state in the charging mode.

3. The battery charging system of claim 1, wherein the controller is configured to turn off the fourth switching element in a driving mode for driving the motor.

4. The battery charging system of claim 3, wherein the charging capacitor is electrically separated from a neutral terminal of the motor formed at the second end of the plurality of third switching elements when the fourth switching element is turned off.

5. The battery charging system of claim 1, wherein the fourth switching element includes a Field Effect Transistor (FET).

6. The battery charging system of claim 1, wherein the fourth switching element is mounted on an inverter board on which the first inverter and the second inverter are mounted.

7. The battery charging system of claim 1, wherein the charging capacitor is provided between the second end of the plurality of third switching elements and the fourth switching element.

8. The battery charging system of claim 1, wherein the fourth switching element is provided between the second end of the plurality of third switching elements and the charging capacitor.

9. The battery charging system of claim 1, wherein, when the DC charging voltage is lower than the voltage of the battery, the controller, in the charging mode, is configured to control all of the plurality of third switching elements to be in the short-circuited state, and configured to perform pulse width modulation control on a lower switching element of the first inverter to boost the DC charging voltage, the lower switching element of the first inverter being a switching element connected to a low-potential terminal of the DC terminal among the switching elements included in the first inverter.

10. The battery charging system of claim 1, wherein, when the DC charging voltage corresponds to the voltage of the battery, the controller, in the charging mode, is configured to control all of the plurality of third switching elements to be in the short-circuited state, and configured to control the charging current to be transmitted to the battery through an upper switching element of the second inverter, the upper switching element of the second inverter being a switching element connected to a high-potential terminal of the DC terminal among the switching elements included in the second inverter.

* * * * *